United States Patent
Mirakyan et al.

(10) Patent No.: US 9,803,130 B2
(45) Date of Patent: Oct. 31, 2017

(54) METHODS OF ACTIVATING ENZYME BREAKERS

(71) Applicant: Schlumberger Technology Corporation, Sugar Land, TX (US)

(72) Inventors: Andrey Mirakyan, Katy, TX (US); Richard D. Hutchins, Sugar Land, TX (US); Jesse C. Lee, Sugar Land, TX (US); Syed A. Ali, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 14/061,096

(22) Filed: Oct. 23, 2013

(65) Prior Publication Data

US 2014/0121136 A1  May 1, 2014

Related U.S. Application Data

(60) Provisional application No. 61/718,548, filed on Oct. 25, 2012.

(51) Int. Cl.
| | |
|---|---|
| *C09K 8/516* | (2006.01) |
| *C09K 8/582* | (2006.01) |
| *C09K 8/52* | (2006.01) |
| *C09K 8/68* | (2006.01) |

(52) U.S. Cl.
CPC .............. *C09K 8/582* (2013.01); *C09K 8/52* (2013.01); *C09K 8/685* (2013.01); *C09K 2208/08* (2013.01); *C09K 2208/24* (2013.01)

(58) Field of Classification Search
CPC .. E21B 43/164; E21B 2034/002; E21B 43/16; E21B 43/26; E21B 47/06; E21B 17/1078; E21B 2034/007; E21B 23/01; E21B 23/14; E21B 33/12; E21B 33/128; E21B 34/063; E21B 34/10; E21B 34/12; E21B 33/127; E21B 33/1291; E21B 33/1292; E21B 34/06; E21B 36/00; E21B 36/008; E21B 37/06; E21B 3/00; E21B 41/00; E21B 41/0064; E21B 41/0092; E21B 41/02; E21B 43/006; E21B 43/10; E21B 44/06; E21B 45/00; E21B 47/01; E21B 47/02208; E21B 47/065; E21B 47/122; E21B 47/14; E21B 47/18; E21B 49/003; E21B 4/02; C09K 21/08; C09K 3/00; C09K 3/14; C09K 3/30; C09K 5/044; C09K 8/516; C09K 21/14; C09K 2208/34; C09K 8/08; C09K 8/36; C09K 8/58; C09K 8/588; C09K 8/805; C09K 8/905
USPC ........................................................ 507/201
See application file for complete search history.

(56) References Cited

U.S. PATENT DOCUMENTS

| | | |
|---|---|---|
| 3,692,676 A | 9/1972 | Culter et al. |
| 4,250,044 A | 2/1981 | Hinkel |
| 4,969,526 A | 11/1990 | Cawiezel |
| 5,067,566 A | 11/1991 | Dawson |
| 5,201,370 A | 4/1993 | Tjon-Joe-Pin |
| 5,224,544 A | 7/1993 | Tjon-Joe-Pin et al. |
| 5,226,479 A * | 7/1993 | Gupta ...................... C09K 8/52 166/300 |
| 5,247,995 A | 9/1993 | Tjon-Joe-Pin et al. |
| 5,421,412 A | 6/1995 | Kelly et al. |
| 5,562,160 A | 10/1996 | Brannon et al. |
| 5,566,759 A | 10/1996 | Tjon-Joe-Pin et al. |
| 5,813,466 A | 9/1998 | Harris et al. |
| 5,869,435 A | 2/1999 | Kelly et al. |
| 6,011,075 A | 1/2000 | Parris et al. |
| 6,140,277 A | 10/2000 | Tibbles et al. |
| 6,197,730 B1 | 3/2001 | Kelly et al. |
| 6,239,183 B1 | 5/2001 | Farmer et al. |
| 6,428,995 B2 | 8/2002 | Kelly et al. |
| 6,482,866 B1 | 11/2002 | Dahayanake et al. |
| 6,506,710 B1 | 1/2003 | Hoey et al. |
| 6,613,720 B1 * | 9/2003 | Feraud ...................... C09K 8/62 166/300 |
| 6,617,285 B2 | 9/2003 | Crews |
| 6,638,896 B1 | 10/2003 | Tibbles et al. |
| 6,703,352 B2 | 3/2004 | Dahayanake et al. |
| 6,818,594 B1 | 11/2004 | Freeman et al. |
| 7,276,466 B2 | 10/2007 | Todd et al. |
| 7,303,018 B2 | 12/2007 | Cawiezel et al. |

(Continued)

FOREIGN PATENT DOCUMENTS

| | | |
|---|---|---|
| WO | 0134939 A1 | 5/2001 |
| WO | WO 01/34939 * | 5/2001 |

(Continued)

OTHER PUBLICATIONS

International Search Report and Written Opinion issued in PCT/US2013/066722 on Dec. 26, 2013, 11 pages.

(Continued)

*Primary Examiner* — Kumar R Bhushan

(74) *Attorney, Agent, or Firm* — Andrea E. Tran

(57) ABSTRACT

A method of treating a subterranean formation, the method including placing a well treatment fluid comprised of at least an enzyme and a breaker additive in the subterranean formation. Initially, the pH of the well treatment fluid is about 11.5. The breaker additive reduces the pH of the well treatment fluid by at least 1.5 to increase the activity of enzyme and accelerate hydrolysis of a crosslinkable component.

17 Claims, 5 Drawing Sheets

(56) References Cited

U.S. PATENT DOCUMENTS

| | | | |
|---|---|---|---|
| 2006/0032636 A1* | 2/2006 | Lord | C09K 8/685 |
| | | | 166/308.2 |
| 2006/0283591 A1 | 12/2006 | Willberg et al. | |
| 2008/0289828 A1* | 11/2008 | Hutchins | C09K 8/68 |
| | | | 166/308.3 |
| 2011/0053813 A1 | 3/2011 | Panga et al. | |

FOREIGN PATENT DOCUMENTS

| | | | |
|---|---|---|---|
| WO | WO01/34939 | * | 5/2001 |
| WO | 02055843 A1 | | 7/2002 |
| WO | 2009020829 A1 | | 2/2009 |

OTHER PUBLICATIONS

Zhang, et al., "A Superior, High-Performance Enzyme for Breaking Borate Crosslinked Fracturing Fluids Under Extreme Well Conditions", SPE 160033—SPE Production & Operations, vol. 28 (2), 2013, pp. 210-216.

Economides, et al, "Section 19.3: Chemical Diverter Techniques", Reservoir Stimulation, 3rd Edition, John Wiley Sons, Ltd., New York: 2000, pp. 19-4 to 19-10.

"Cellulase: Definition", from Enzyme Nomeclature: Recommendations of the Nomenclature Committee of the International Union of Biochemistry and Molecular Biology on the Nomenclature and Classification of Enzymes by the Reactions They Catalyse. available at <http://www.chem.qmul.ac.uk/iubmb/enzyme/EC3/2/1/4.html> retrieved May 7, 2014.

* cited by examiner

METHODS OF ACTIVATING ENZYME BREAKERS

This application claims the benefit of U.S. Provisional Application Ser. No. 61/718,548 filed Oct. 25, 2012 entitled "Methods of Activating Enzyme Breakers" to Mirakyan et al., the disclosure of which is incorporated by reference herein in its entirety.

BACKGROUND

Hydrocarbons (oil, natural gas, etc.) may be obtained from a subterranean geologic formation (a "reservoir") by drilling a well that penetrates the hydrocarbon-bearing formation. Well treatment methods often are used to increase hydrocarbon production by using a treatment fluid to interact with a subterranean formation in a manner that ultimately increases oil or gas flow from the formation to the wellbore for removal to the surface.

Recovery of hydrocarbons from a subterranean formation is known as "production." One key parameter that influences the rate of production is the permeability of the formation along the flowpath that the hydrocarbon must travel to reach the wellbore. Sometimes, the formation rock has a naturally low permeability; other times, the permeability is reduced during, for instance, drilling the well. When a well is drilled, a drilling fluid is often circulated into the hole to contact the region of a drill bit. This drilling fluid can be lost by leaking into the formation. To prevent this, the drilling fluid is often intentionally modified so that a small amount of its liquid content leaks off and the remaining solid content forms a coating on the wellbore surface (often referred to as a "filtercake" or "mud cake"—described in more detail below). Once drilling is complete, and production is desired, this coating or filtercake must be removed to re-establish the flowpath from the formation into the well.

Well treatment fluids, particularly those used in fracturing (fracturing fluids) or those used in gravel packing operations (gravel packing fluids), may comprise a water or oil based fluid incorporating a thickening agent, normally a polymeric material. Polymeric thickening agents for use in such fluids may comprise galactomannan gums, such as guar and substituted guars such as hydroxypropyl guar and carboxymethylhydroxypropyl guar (CMHPG). Cellulosic polymers such as carboxymethyl cellulose (CMC) may also be used, as well as synthetic polymers such as polyacrylamide. Such fracturing fluids can have a high viscosity during a treatment to develop a desired fracture geometry and/or to carry proppant into a fracture with sufficient resistance to settling. These fluids can also develop a filter cake which includes the polymeric additives.

The recovery of the fracturing fluid is achieved by reducing the viscosity of the fluid such that the fluid flows naturally through the proppant pack. Chemical reagents, such as oxidizers, chelants, acids and enzymes may be employed to break the polymer networks to reduce their viscosity. These materials are commonly referred to as "breakers" or "breaking agents." Such conventional fracturing fluid breaking technologies are known and work well at relatively low and high temperatures.

Hydraulic fracturing and gravel packing require the use of viscosified fluids to suspend or transport the gravel or proppant. However, whenever polymeric viscosifiers are used some degree of formation damage is created which requires removal to optimize oil and gas production and recovery. Therefore breakers, such as enzymes, are frequently employed to reduce or remove the effects of formation damage.

Most polymeric fluids used in oilfield applications damage the formation by leaving behind a filtercake used to control fluid leak-off into the formation and to restrict the inflow of reservoir fluids into the formation rock during drilling and completion techniques. If the filtercake damage is not removed prior to or during completion of the well, a range of issues can arise, for example, completion equipment failures, impaired reservoir productivity, and so on.

The major components typically found in filtercakes can include polymers, such as starch, guar, derivatized guars such as CMHPG, cellulosic polymers such as CMC, xanthan gum, polyacrylamides and co- or ter-polymers containing acrylamide, acrylic acid, vinyl pyrrolidone or acrylamidomethyl-propane sulfonate monomers and solids, such as carbonates, silica, mica and other inorganic salts and clays. The solids in the mud or fluid are sized such that they can form an efficient bridge across the pores of the formation rock as the well is being drilled or during injection of the fluid during the fracturing process. As the solids in the mud or fluid develop bridges across the exposed pores or pore throats of the reservoir, the polymeric fluid loss material from the mud or fluid can be co-deposited within the interstices of the solid bridging particles, thus sealing off the reservoir from the wellbore or fracture. These polymeric materials can comprise an integral component of the resulting filtercake, typically 17 to 20 weight percent of the dry filtercake, and can be responsible for the ultra-low permeability of the filtercake.

Cleanup of polymer-based filter cakes in long horizontal and multilateral wells is a difficult, but very important task. Both mechanical approaches such as water jetting, and chemical means such as acids, oxidizers, and enzymes, have been used in the field with limited success to remove mud cakes. Conventional chemical treatments for removing filtercake from the fracture typically involve placing aqueous breakers into the fracturing fluid that forms the filtercake, wherein the breaking action is delayed by temperature or encapsulation. For mud cake removal after drilling, conventional chemical treatments involve placement of breaker solutions near the filter cake with a soak time to a allow reaction to occur. These treatments may use oxidizers, enzymes or a combination, and in the case of mud cakes, may also employ mineral and/or organic acids, or chelating agents. Generally, the oxidizer or enzyme breakers digest the polymer layer in the filtercake, and when the solids in the mud cake are soluble such as carbonate, the chelants and acids dissolve the solid portion of the filtercake. These methods have serious limitations, which can adversely affect well performance. Acids and oxidizers are non-specific, and are very reactive, because of which uniform removal of the filter or mud cake is very difficult.

As compared to oxidative breakers, benefits potentially associated with enzymes include high selectivity towards the polymer backbone, autocatalysis which means just small amounts of the enzyme breaker, can be effective, and a better health, safety and environmental (HSE) profile. Enzymes can be higher in molecular weight than oxidative breakers so that they tend not to leak off into the surrounding formation, and can also be less susceptible to dramatic changes in activity by trace contaminants. Enzymes can be used to degrade polymers and can facilitate uniform treatment of the filter cake induced damage. For example, well treatment fluids for gravel packing, available under the trade designation MudSOLV and described in U.S. Pat. No. 6,638,896 and U.S. Pat. No. 6,140,277, the disclosures of which are incorporated by reference herein in their entirety, describe a gravel carrying fluid containing enzyme for polymer removal in filter cake remediation, chelating agent to dissolve carbonate, and a cationic or non-ionic viscoelastic surfactant (VES) system at a sufficiently high concentration to viscosify the fluid.

However, enzymes used in conventional filter cake removal are subject to some limitations, such as the loss of suitable enzymatic activity at downhole conditions and possible permanent denaturation of the enzyme, rendering its activity to be essentially zero, before a sufficient period of time has elapsed that is adequate for the enzyme to break the polymer. For oilfield applications, enzyme reaction times are usually at least 4 hours at temperature for mud cake removal and even longer for fracture cleanup. Activity of the enzyme, or the ability of the enzyme to catalyze breaking of the polymer by hydrolysis, for example, may also be an important benefit. However, because the enzyme is a catalyst rather than a reactant which would otherwise be consumed in the breaking reaction, a small amount of active enzyme may be effective where the enzyme concentration is not rate-limiting.

Other limitations of enzymes include these materials being extremely sensitive to pH, ionic strength and temperature. High salinity, especially in the presence of divalent ions like calcium, can also prematurely inactivate and/or coagulate enzymes.

Enzymes begin to lose their activity at higher temperatures. A major limitation of enzymes is their inability to stay active at temperatures above 93° C. (200° F.). For example, experimental studies reported in the literature show that the activity of enzymes at 97° C. (207° F.) is less than 10% of activity at 93° C. (200° F.). There can be variations in their activity at the upper temperature limit depending on the source of the enzyme, as one hemi-cellulase still retains some activity at 135° C. (275° F.).

For an improved enzyme breaker, oilfield applications generally seek applicability across a broader pH, salinity, and temperature range, e.g. above 93° C. (200° F.), above 107° C. (225° F.), or even above 121° C. (250° F.); efficacy at pH levels above 10, above 10.5, above 11 or above 11.5, storability without refrigeration, e.g. at or above ambient temperature; improved logistics; and easy mixing.

The temperature dependence of enzymes must be understood to apply them correctly at oilfield conditions. Within its activity range, an enzyme generally speeds up a reaction more as the temperature is increased. However, reactions that deactivate the enzyme, e.g. the denaturation of proteins, are also favored at higher temperatures. Hence, there exists an optimum temperature for a given time and turnover requirement. The temperature limit for use of a given enzyme depends critically on the kinetics of turnover, deactivation, and transport. The faster an enzyme can be brought to the place where it has to do its job, the higher the maximum temperature at which it can be used. Wells with higher bottomhole static temperature (BHST) may still be treated, depending on the temperature gradient and the process design. In these cases, field treatment procedures must be tuned to bring enzyme to the desired cleanup location downhole at a sufficiently low temperature and for a sufficient time to enable it to degrade the polymer, before the enzyme is deactivated and/or coagulated by the heat.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, the present disclosure relates a method of treating a subterranean formation, the method including placing a well treatment fluid comprised of at least an enzyme and a breaker additive in the subterranean formation. Initially, the pH of the well treatment fluid is about 11.5. The breaker additive reduces the pH of the well treatment fluid by at least 1.5 to increase the activity of enzyme and accelerate hydrolysis of a crosslinkable component.

In other embodiments, the present disclosure relates to a method of treating a subterranean formation, the method including placing a well treatment fluid comprised of at least an enzyme and a breaker additive in the subterranean formation, the well treatment fluid having an initial pH about 11.5. The breaker additive reduces the pH of the well treatment fluid by at least 1.5 to increase the activity of enzyme and accelerate hydrolysis of the crosslinkable component. Further, the enzyme is initially in an inactive state due to at least the solution pH.

BRIEF DESCRIPTION OF DRAWINGS

The manner in which the objectives of the present disclosure and other desirable characteristics may be obtained is explained in the following description and attached drawings in which.

DETAILED DESCRIPTION

Figure 1:
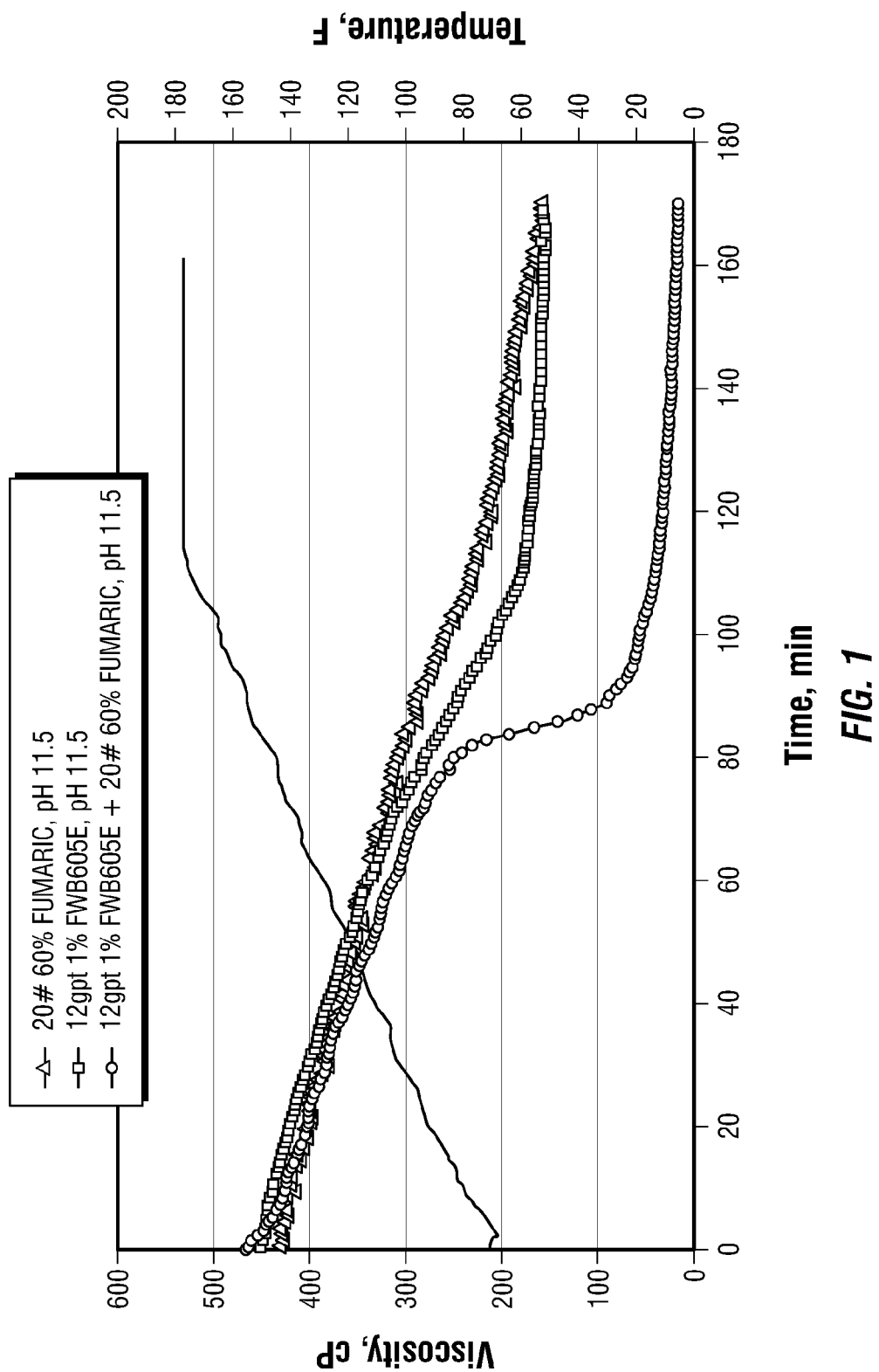
FIG. 1 is an illustration of the rheology profile of the fluids of Example 1.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The statements made herein merely provide information related to the present disclosure and may not constitute prior art, and may describe some embodiments illustrating aspects of the invention.

Disclosed herein is a method of treating a subterranean composition, the method comprising placing a well treatment fluid comprised of at least an enzyme and a breaker additive in the subterranean formation, wherein the breaker additive reduces the pH of the well treatment fluid to increase the activity of enzyme and accelerate hydrolysis of a crosslinkable component.

Enzymes

Described herein is a method of treating a subterranean composition, the method comprising placing a well treatment fluid comprised of at least an enzyme and a breaker additive in the subterranean formation. The breaker additive reduces the pH of the well treatment fluid to increase the activity of enzyme and accelerate hydrolysis of a crosslinkable component.

These compositions contain inactivated enzymes that are capable of being activated or reactivated by a chemical or physical signal or by a change in fluid conditions. The enzymes remain inactive until such time as a change in the properties of the fluid is desired. The enzyme is then activated upon exposure to a chemical or physical signal, or a change in the subterranean formation, such as a decrease in pH and/or temperature. Upon activation, such enzymes are capable of selectively degrading fluid components, such as the polymer in the treatment composition.

The enzyme may be any oxidoreductase, hydrolase or lyase enzyme that is soluble in water capable of degrading polymeric substrates, especially the types of polysaccharides used in filtercakes, fracturing and blocking gels, as well as in other applications in the oil and gas industry, albeit at low to moderate temperatures. As used herein, enzyme classification (EC), subclasses and related terminology follow the Recommendations of the Nomenclature Committee of the International Union of Biochemistry and Molecular Biology on the Nomenclature and Classification of Enzymes by the Reactions They Catalyze, as reported in *Enzyme Nomenclature* 1992, Academic Press, San Diego, Calif. (1992) and its supplements to date. Hydrolases do not usually require co-enzymes, which is a considerable advantage. The enzymes can include, for example, cellulases, hemi-cellulases, pectinases, xanthanase, mannanase, α-galactosidase, amylase and the like, and mixtures thereof. Amylases can include α-, β- and γ-amylases, especially α-amylases.

As used in breaking technology, enzymes may be used to degrade the particular linkages found on the polymer backbone, such as the 1,4-linkage between mannose in galactomannans in the case of mannanases or cellulosics, at particular temperature ranges where the enzyme is active. See, for example, U.S. Pat. Nos. 5,067,566; 5,201,370; 5,224,544; 5,226,479; 5,247,995; 5,421,412; 5,562,160; and 5,566,759, the disclosures of which are incorporated by reference herein in their entirety.

Xanthanases, for example, can degrade xanthan-containing materials at low to moderate temperatures of up to about 66° C. (150° F.), but can be less effective at temperatures above about 66° C. (150° F.). The present application may be used in connection with thermally unstable enzymes, referred to herein as "mesophilic" enzymes, that are active and stable in brine at relatively low temperatures, but denature or substantially lose activity at an elevated temperature, especially where thermal stability is needed at an elevated temperature above about 60° C., 80° C., 90° C., 100° C., 107° C., or 120° C., or higher. Most α-amylases, for example, are known to denature in high brines at a relatively low temperature and as a result heretofore could not be viably used in downhole environments at higher temperatures.

Breaker Additive

The breaker additive may be a material that initially inert but at least a portion of the breaker additive slowly degrades and thus hydrolyzes in the well treatment or fracturing fluid, thereby gradually lowering the pH of the gelled fluid and/or filter cake to increase the activity of the enzyme breaker and/or to accelerate hydrolysis of the crosslinkable component. In embodiments, the pH of the well treatment fluid may first be raised (i.e., prior to the activation of the breaker additive) to a pH above about 10.5 to 12, such as, for example, from about 10.5 to about 11.5, from about 10.5 to about 11, or from about 11 to about 12. However, the pH of the well treatment fluid may have any of the above-mentioned pH initially and thus not require any addition of a buffer. If a buffer is required, this initial pH increase may be implemented using a suitable buffer, such as, for example, sodium, ammonium, or potassium carbonate, trisodium or tripotassium phosphate, sodium or potassium pyrophosphate, sodium or potassium silicate, and sodium or potassium hydroxide The enzyme is inert, but not permanently denatured at this pH, while the gel strength is increased. The activity of the enzyme can be assessed in multiple ways. Two methods are described in SPE 160033-PA, the disclosure of which is incorporated by reference herein in its entirety.

As the fluid is placed or located into the subterranean formation, the breaker additive slowly degrades to release an acid. As the acid is introduced into the formation and the pH of the fluid declines below about 11.5, such as for example, a pH below about 11, a pH below about 10.5, a pH below about 10.0 and a pH below about 9.5, the enzyme breaker activates and begins to degrade the polymer used in the fluid and to accelerate hydrolysis of the crosslinkable component. Moreover, upon introduction of the acid, the pH of the fluid decrease by at least about 1.5, such as for example, from about 1.5 to about 3.5 and from about 2.0 to about 3.0.

In embodiments, the breaker additive may be an encapsulated acid, an ester (which may also be encapsulated), a hydrolysable fiber or combinations thereof. The encapsulated acid may be comprised of an acidic material that is encapsulated or coated with an encapsulating material. Examples of encapsulated acid include solid acids, such as dicarboxylic acids. Specific examples of dicarboxylic acids include oxalic acid, propanedioic acid, malonic acid, fumaric acid, maleic acid, succinic acid, glutaric acid, pentanedioic acid, adipic acid, phthalic acid, isophthalic acid, terephthalic acid, aspartic acid, glutamic acid, and combinations thereof. Other solid acids include citric acid and sulfamic acid. With certain encapsulating technologies, liquid acids can also be encapsulated and these acids could be mineral acids such as hydrochloric acid, or organic acids such as formic or acetic acid.

In embodiments, the breaker additive may also be an ester. Furthermore, the ester may also be encapsulated with one or more of the encapsulating materials discussed below to further delay the activity of the enzyme and prevent an undesired fast reduction in pH that may occur with some esters. Preferred esters are those with a delay in pH reduction of several minutes to several hundred minutes at temperature. Although most any ester can be used in encapsulated form, unencapsulated esters require a relatively slow reaction at formation temperature. Specific examples of slower acting esters include butyl propionate, tributyrin, ethyl propionate, propyl propionate, and fatty acid esters, and combinations thereof. Specific examples of esters include dimethyl succinate, ethyl acetate, ethyl propionate, ethyl butyrate, diethyl adipate, n-butyl acetate, dimethyl adipate, diethyl succinate, diethyl fumarate, dimethyl malate, diethyl malate, dimethyl itaconate, dimethyl maleate, diethyl maleate, diethyl malonate, dimethyl malonate, dimethyl acetylsuccinate, dimethyl diethyl malonate, methyl butyrate, dimethyl oxalate, diethyl oxalate, diethyl glutarate, dimethyl glutarate, propyl acetate, ethyl formate, propyl formate, cinnamyl acetate, dimethyl azelate, diethyl azelate, and butyl formate, The breaker additive may also be a hydrolysable fiber. Examples of the hydrolysable fibers include unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, and copolymers of lactic acid with other hydroxy-, carboxylic acid-, or hydroxycarboxylic acid-containing moieties, and mixtures of those materials.

The encapsulating material may be removed from acidic material or ester by heating the encapsulating material to the melting point of the encapsulating material, the temperature of heating being applied by the subterranean formation. The encapsulating material may be any material having a melting point greater than about 120° F. (48.89° C.), such as, from about 120° F. (48.89° C.) to about 350° F. (176.67° C.), from about 140° F. (60° C.) to about 300° F. (148.89° C.), from about 160° F. (71.11° C.) to about 250° F. (121.11° C.), from about 180° F. (82.22° C.) to about 220° F. (104.44° C.). To prevent the enzyme from immediately activating (i.e., delaying the breaking capability of the enzyme), the encapsulating material may be any suitable hydrophobic coating such as, for example, petroleum waxes and derivatives thereof such as paraffin wax, microcrystalline wax and petrolatum; montan wax and derivatives thereof; hydrocarbon waxes obtained by Fischer-Tropsch synthesis, and derivatives thereof; polyethylene wax and derivatives thereof; and naturally occurring waxes such as carnauba wax and candelilla wax, and derivatives thereof. The derivatives include oxides, block copolymers with vinyl monomers, and graft modified products. Additional encapsulating materials include, for example, acrylic polymers, such as ethylene acrylic acid copolymers (EAA); ethylene methyl acrylate copolymers (EMA); ethylene methacrylic acid polymers (EMMA); polyvinylidene chloride (PVdC), poly(vinyl)alcohol (PVOH) and ethylene vinyl alcohol (EVOH). Other materials include polymethylene urea or phenol-aldehyde polymers.

Additional methods of removing the encapsulating material from the breaker additive include rupturing the material due to mechanical or shear stress, osmotic rupture, or dissolution.

The breaking effect of the breaking agent may be accomplished either in the presence or absence of a breaker activator (also referred to as a "breaking aid"). If employed, the breaker activator may be entirely different than the breaker additive discussed above. A breaker activator may be present to further encourage the redox cycle that activates the breaking agent. In some embodiments, the breaker activator may comprise an amine, such as oligoamine activators, for example, tetraethylenepentaamine (TEPA) and pentaethylenehexaamine (PEHA); or chelated metals. Further breaker aids may include ureas, ammonium chloride and the like, and those disclosed in, for example, U.S. Pat. Nos. 4,969,526, and 4,250,044, the disclosures of which are incorporated herein by reference in their entireties.

The amount of breaker activator that may be included in the viscosified or unviscosified treatment fluid (or aqueous or organic based fluid) is an amount that will sufficiently activate the breaking effect of the breaking agent, which is dependent upon a number of factors including the injection time desired, the polymeric material and its concentration, and the formation temperature. In embodiments, the breaker activator will be present in the viscosified or unviscosified treatment fluid (or aqueous or organic based fluid) in an amount in the range of from about 0.01% to about 1.0% by weight, such as from about 0.05% to about 0.5% by weight, of the viscosified or unviscosified treatment fluid (or aqueous or organic based fluid). In specific embodiments, no breaker activator may be present to sufficiently activate the breaking effect of the breaking agent.

The polymers present in the viscosified fluid may be those commonly used with fracturing fluids. The polymers may be used in either crosslinked or non-crosslinked form. The polymers may be capable of being crosslinked with any suitable crosslinking agent, such as metal ion crosslinking agents. Examples of such materials include boron and the polyvalent metal ions of aluminum, antimony, zirconium, titanium, chromium, etc., that react with the polymers to form a composition with adequate and targeted viscosity properties for various operations. The crosslinking agent may be added in an amount that results in suitable viscosity and stability of the gel at the temperature of use. Crosslinkers may be added at concentrations of about 0.5 to about 4000 or about 1 to about 1000 parts per million (ppm) of active metal or organic weight. That concentration may be adjusted based on the polymer concentration.

The crosslinker may be added as a solution and may include a ligand which delays the crosslinking reaction. This delay may be beneficial in that the high viscosity fracturing fluid is not formed until near the bottom of the wellbore to minimize frictional pressure losses and to prevent irreversible shear degradation of the gel, such as when Zr or Ti crosslinking agents are used. Delayed crosslinking may be time, temperature or both time and temperature controlled to facilitate a successful fracturing process.

Other crosslinkers may include organic crosslinkers such as polyethyleneimines, aldehydes, phenol-aldehydes, or urea-aldehydes. Suitable compounds include formaldehyde, formalin, paraformaldehyde, glyoxal, and glutaraldehyde. Compounds which react to form crosslinks include hexamethylenetetramine with phenolic compounds such as phenyl acetate, phenol, hydroquinone, resorcinol, and naphthalene diols.

The crosslinkable components and amount used in the viscosified fluid may provide a fluid viscosity (from about 1 cP to about 100,000 cP at the treating temperature) that is sufficient to generate fracture width and facilitate transport and prevention of undue settling of the proppant within the fracture during fracture propagation. Generally, the polymer concentration is reduced to avoid proppant pack damage while still maintaining sufficient viscosity for opening the fracture and transporting proppant. In embodiments, the concentration of polymer may be selected to facilitate a primary goal of higher proppant loading in the fracture.

Crosslinking the unviscosified fluid with crosslinkable components generally increases its viscosity. As such, having the fluid in the unviscosified state allows for pumping of a relatively less viscous fluid having relatively low friction pressures within the well tubing, and the crosslinking may be delayed in a controllable manner such that the properties of viscosified fluid are available at the rock face instead of within the wellbore. Such a transition to a viscosified fluid state may be achieved over a period of minutes or hours based on the molecular make-up of the crosslinkable components, and results in the initial viscosity of the crosslinkable fluid increasing by at least an order of magnitude, such as at least two orders of magnitude.

In embodiments, the action (the breaking effect) of the enzyme in combination with the breaking additive may be at a temperature in the range from about 79.4° C. (175° F.) to about 135° C. (275° F.), such as from about 79.4° C. (175° F.) to about 121° C. (250° F.), from about 93.3° C. (200° F.) to about 121° C. (250° F.), or from about 93.3° C. (200° F.) to about 107° C. (225° F.), such as reducing the viscosity of the viscosified fluid by at least about one order of magnitude to about three orders of magnitude, or reducing the viscosity of the viscosified fluid by at least about one order of magnitude to about two orders of magnitude while the viscosified fluid is at a temperature in the range of from about 79.4° C. (175° F.) to about 135° C. (275° F.), such as from about 79.4° C. (175° F.) to about 121° C. (250° F.), from about 93.3° C. (200° F.) to about 121° C. (250° F.), or from about 93.3° C. (200° F.) to about 107° C. (225° F.). The reduction in viscosity may be determined at a shear rate of $100^{-1}$ and a temperature of 25° C.

In embodiments, the action (the breaking effect) of the enzyme may reduce the viscosity of the viscosified fluid by at least 80%, or by at least 95%, while the viscosified fluid is at a temperature in the range of from about 79.4° C. (175° F.) to about 135° C. (275° F.), such as from about 79.4° C. (175° F.) to about 121° C. (250° F.), from about 93.3° C. (200° F.) to about 121° C. (250° F.), or from about 93.3° C. (200° F.) to about 107° C. (225° F.), such as reducing the viscosity of the viscosified fluid by at least 80% to about 99.99%, or reducing the viscosity of the viscosified fluid by at least about 95% to about 99% while the viscosified fluid is at a temperature in the range of from about 79.4° C. (175° F.) to about 135° C. (275° F.), such as from about 79.4° C. (175° F.) to about 121° C. (250° F.), from about 93.3° C. (200° F.) to about 121° C. (250° F.), or from about 93.3° C. (200° F.) to about 107° C. (225° F.).

Crosslinkable Component and Crosslinking Agent

The unviscosified fluids or compositions suitable in the methods of the present disclosure may comprise a crosslinkable component. A "crosslinkable component," as the term is used herein, is a compound and/or substance that comprises a crosslinkable moiety capable of being crosslinked by a crosslinking agent. In embodiments, the viscosified fluids of the present disclosure may also be prepared from a fluid with the crosslinkable components initially having a very low viscosity that can be readily pumped or otherwise handled and that are subsequently crosslinked, such as once it is downhole, to form the viscosified fluid. For example, the viscosity of the initial fluid with crosslinkable components may be from about 1 cP to about 10,000 cP, or be from about 1 cP to about 1,000 cP, or be from about 1 cP to about 100 cP at the treating temperature, which may range from a surface temperature to a bottom-hole static (reservoir) temperature.

Suitable crosslinking agents for the methods of the present disclosure would be capable of crosslinking polymer molecules to form a three-dimensional network. Suitable organic crosslinking agents include, but are not limited to, aldehydes, dialdehydes, phenols, polyethyleneimines, substituted phenols, and ethers, as well as precursors that degrade to form these compounds such as formaldehyde formed from the decomposition of hexamethylenetetramine. Suitable inorganic crosslinking agents include, but are not limited to, polyvalent metals, conventional chelated polyvalent metals, and compounds capable of yielding polyvalent metals. The concentration of the crosslinking agent in the crosslinkable fluid may be from about 0.001 wt % to about 10 wt %, such as about 0.005 wt % to about 2 wt %, or about 0.01 wt % to about 1 wt %.

The crosslinkable component may be natural or synthetic polymers (or derivatives thereof) that comprise a crosslinkable moiety, for example, substituted galactomannans, guar gums, high-molecular weight polysaccharides composed of mannose and galactose sugars, or guar derivatives, such as hydrophobically modified guars, guar-containing compounds, and synthetic polymers. Suitable crosslinkable components may comprise a guar gum, a locust bean gum, a tara gum, a honey locust gum, a tamarind gum, a karaya gum, an arabic gum, a ghatti gum, a tragacanth gum, a carrageenan, a succinoglycan, a xanthan, a dibutan, a hydroxylethylguar, a hydroxypropyl guar, a carboxymethylhydroxyethyl guar, a carboxymethylhydroxypropylguar, an alkylcarboxyalkyl cellulose, an alkyl cellulose, an alkylhydroxyalkyl cellulose, a carboxyalkyl cellulose ether, a hydroxyethylcellulose, a carboxymethylhydroxyethyl cellulose, a carboxymethyl starch, a copolymer of 2-acrylamido-2-methyl-propane sulfonic acid and acrylamide, a terpolymer containing monomers of 2-acrylamido-2-methyl-propane sulfonic acid, acrylic acid, acrylamide, vinyl pyrollidone or derivatives thereof. In embodiments, the crosslinkable components may be present at about 0.01% to about 4.0% by weight based on the total weight of the crosslinkable fluid, such as at about 0.10% to about 2.0% by weight based on the total weight of the crosslinkable fluid.

Suitable solvents for use with the unviscosified fluid, viscosified fluid, breaker additive and/or enzyme employed in the methods of the present disclosure may be aqueous or organic-based. In embodiments, the enzyme and breaker additive may be introduced into the subterranean formation in a fluid (aqueous or organic) that is separate from the unviscosified fluid or viscosified fluid. In embodiments, the breaking agent may be introduced into the subterranean formation after being mixed into either an unviscosified fluid or a viscosified fluid. Aqueous solvents may include at least one of fresh water, sea water, brine, mixtures of water and water-soluble organic compounds and mixtures thereof. Organic solvents may include any organic solvent which is able to dissolve or suspend the various components of the crosslinkable fluid. Mutual solvents such as ethylene glycol monobutyl ether or diethylene glycol monobutyl ether are also included.

In embodiments, the solvent, such as an aqueous solvent, may represent up to about 99.9 weight percent of the unviscosified or viscosified fluid, such as in the range of from about 85 to about 99.9 weight percent of the viscosified fluid, or from about 98 to about 99.7 weight percent of the viscosified fluid. The solvent may be a combination of any of the materials described above.

Additional Materials

While the viscosified fluids or viscosified treatment fluids of the present disclosure are described herein as comprising the above-mentioned components, it should be understood that the fluids of the present disclosure may optionally comprise other chemically different materials. In embodiments, the unviscosified and/or viscosified fluids of the present disclosure may further comprise stabilizing agents, surfactants, diverting agents, or other additives. Additionally, the unviscosified and/or viscosified fluids may comprise a mixture of various crosslinking agents, and/or other additives, such as fibers or fillers, provided that the other components chosen for the mixture are compatible with the intended application. In embodiments, the unviscosified and/or viscosified fluids of the present disclosure may further comprise one or more components selected from the group consisting of a conventional gel breaker, a buffer, a proppant, a clay stabilizer, a gel stabilizer, a surfactant and a bactericide. Furthermore, the unviscosified and/or viscosified fluids may comprise buffers, pH control agents, and various other additives added to promote the stability or the functionality of the fluid. The unviscosified and/or viscosified fluids may be based on an aqueous or non-aqueous solution. The components of the unviscosified and/or viscosified fluids may be selected such that they may or may not react with the subterranean formation that is to be fractured.

In this regard, the unviscosified and/or viscosified fluids may include components independently selected from any solids, liquids, gases, and combinations thereof, such as slurries, gas-saturated or non-gas-saturated liquids, mixtures of two or more miscible or immiscible liquids, and the like, as long as such additional components allow for the breakdown of the three dimensional structure upon substantial completion of the treatment. For example, the unviscosified and/or viscosified fluids may comprise organic chemicals, inorganic chemicals, and any combinations thereof. Organic chemicals may be monomeric, oligomeric, polymeric, crosslinked, and combinations, while polymers may be thermoplastic, thermosetting, moisture setting, elastomeric, and the like. Inorganic chemicals may be metals, alkaline and alkaline earth chemicals, minerals, and the like. Fibrous materials may also be included in the crosslinkable fluid or treatment fluid. Suitable fibrous materials may be woven or nonwoven, and may be comprised of organic fibers, inorganic fibers, mixtures thereof and combinations thereof.

Stabilizing agents can be added to slow the degradation of the crosslinked structure of the viscosified fluid after its formation downhole. Stabilizing agents may include buffering agents, such as agents capable of buffering at pH of about 8.0 or greater (such as water-soluble bicarbonate salts, carbonate salts, phosphate salts, or mixtures thereof, among others); polyols such as sorbitol or sodium gluconate, and chelating agents (such as ethylenediaminetetraacetic acid (EDTA), nitrilotriacetic acid (NTA), or diethylenetriaminepentaacetic acid (DTPA), hydroxyethylethylenediaminetriacetic acid (HEDTA), or hydroxyethyliminodiacetic acid (HEIDA), among others), which may or may not be the same as used for the coordinated ligand system of the chelated metal. Buffering agents may be added to the crosslinkable fluid or treatment fluid in an amount from about 0.05 wt % to about 10 wt %, and from about 0.1 wt % to about 2 wt %, based upon the total weight of the unviscosified and/or viscosified fluids. Chelating agents may also be added to the unviscosified and/or viscosified fluids.

The aqueous base fluids of the present application may generally comprise fresh water, salt water, sea water, a brine (e.g., a saturated salt water or formation brine), or a combination thereof. Other water sources may be used, including those comprising monovalent, divalent, or trivalent cations (e.g., magnesium, calcium, zinc, or iron) and, where used, may be of any weight.

Chelation is the formation or presence of two or more separate bindings between a multiple-bonded ligand and a single central atom. These ligands may be organic compounds, and are called chelating agents, chelants, or chelators. A chelating agent forms complex molecules with certain metal ions, inactivating the ions so that they cannot normally react with other elements or ions to produce precipitates or scale. Example of chelating agents include nitrilotriacetic acid (NTA); citric acid; ascorbic acid; hydroxyethylethylenediaminetriacetic acid (HEDTA) and its salts, including sodium, potassium, and ammonium salts; ethylenediaminetetraacetic acid (EDTA) and its salts, including sodium, potassium, and ammonium salts; diethylenetriaminepentaacetic acid (DTPA) and its salts, including sodium, potassium, and ammonium salts; phosphinopolyacrylate; thioglycolates; and a combination thereof. Other chelating agent are: aminopolycarboxylic acids and phosphonic acids and sodium, potassium and ammonium salts thereof; HEIDA (hydroxyethyliminodiacetic acid); other aminopolycarboxylic acid members, including EDTA and NTA (nitrilotriacetic acid), but also: DTPA (diethylenetriamine-pentaacetic acid), and CDTA (cyclohexylenediamintetraacetic acid) are also suitable; phosphonic acids and their salts, including ATMP (aminotri-(methylenephosphonic acid)), HEDP (1-hydroxyethylidene-1,1-phosphonic acid), HDTMPA (hexamethylenediaminetetra-(methylenephosphonic acid)), DTPMPA (diethylenediaminepenta-(methylenephosphonic acid)), and 2-phosphonobutane-1,2,4-tricarboxylic acid.

Aqueous fluid embodiments may also comprise an organoamino compound. Examples of suitable organoamino compounds may include tetraethylenepentamine (TEPA), triethylenetetramine, pentaethylenehexamine, triethanolamine, and the like, or any mixtures thereof. When organoamino compounds are used in fluids described herein, they are incorporated at an amount from about 0.01 wt % to about 2.0 wt % based on total liquid phase weight. The organoamino compound may be incorporated in an amount from about 0.05 wt % to about 1.0 wt % based on total weight of the fluid.

Thermal stabilizers may also be included in the viscosified or unviscosified fluids. Examples of thermal stabilizers include, for example, methanol, alkali metal thiosulfate, such as sodium thiosulfate, and ammonium thiosulfate. The concentration of thermal stabilizer in the fluid may be from about 0.1 to about 5 weight %, from about 0.2 to about 2 weight %, from about 0.2 to about 1 weight %, from about 0.5 to about 1 weight % of the thermal stabilizers based on the total weight of the fracturing fluid.

One or more clay stabilizers may also be included in the viscosified or unviscosified fluids. Suitable examples include hydrochloric acid and chloride salts, such as, choline chloride, tetramethylammonium chloride (TMAC) or potassium chloride. Aqueous solutions comprising clay stabilizers may comprise, for example, 0.05 to 0.5 weight % of the stabilizer, based on the combined weight of the aqueous liquid and the organic polymer (i.e., the base gel). Surfactants can be added to promote dispersion or emulsification of components of the unviscosified and/or viscosified fluids, or to provide foaming of the crosslinked component upon its formation downhole. Suitable surfactants include alkyl polyethylene oxide sulfates, alkyl alkylolamine sulfates, modified ether alcohol sulfate sodium salts, or sodium lauryl sulfate, among others. Any surfactant which aids the dispersion and/or stabilization of a gas component in the fluid to form an energized fluid can be used. Viscoelastic surfactants, such as those described in U.S. Pat. Nos. 6,703,352;

6,239,183; 6,506,710; 7,303,018 and 6,482,866, the disclosures of which are incorporated herein by reference in their entireties, are also suitable for use in fluids in some embodiments. Examples of suitable surfactants also include, but are not limited to, amphoteric surfactants or zwitterionic surfactants. Alkyl betaines, alkyl amido betaines, alkyl imidazolines, alkyl amine oxides and alkyl quaternary ammonium carboxylates are some examples of zwitterionic surfactants. An example of a useful surfactant is the amphoteric alkyl amine contained in the surfactant solution AQUAT 944® (available from Baker Petrolite of Sugar Land, Tex.). A surfactant may be added to the crosslinkable fluid in an amount in the range of about 0.01 wt % to about 10 wt %, such as about 0.1 wt % to about 2 wt %.

Charge screening surfactants may be employed. In some embodiments, the anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates may be used. Anionic surfactants have a negatively charged moiety and a hydrophobic or aliphatic tail, and can be used to charge screen cationic polymers. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Cationic surfactants have a positively charged moiety and a hydrophobic or aliphatic tail, and can be used to charge screen anionic polymers such as CMHPG.

In other embodiments, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids.

Friction reducers may also be incorporated in any fluid embodiment. Any suitable friction reducer polymer, such as polyacrylamide and copolymers, partially hydrolyzed polyacrylamide, poly(2-acrylamido-2-methyl-propane sulfonic acid) (polyAMPS), and polyethylene oxide may be used. Commercial drag reducing chemicals such as those sold by Conoco Inc. under the trademark "CDR" as described in U.S. Pat. No. 3,692,676 or drag reducers such as those sold by Chemlink designated under the trademarks FLO1003, FLO1004, FLO1005 and FLO1008 have also been found to be effective. These polymeric species added as friction reducers or viscosity index improvers may also act as excellent fluid loss additives reducing the use of conventional fluid loss additives. Latex resins or polymer emulsions may be incorporated as fluid loss additives. Shear recovery agents may also be used in embodiments.

Diverting agents may be added to improve penetration of the unviscosified and/or viscosified fluids into lower-permeability areas when treating a zone with heterogeneous permeability. The use of diverting agents in formation treatment applications is known, such as given in Reservoir Stimulation, $3^{rd}$ edition, M. Economides and K. Nolte, eds., Section 19.3.

The viscosified fluid for treating a subterranean formation of the present disclosure may be a fluid that has a viscosity above about 50 centipoise at 100 sec$^{-1}$, such as a viscosity above about 100 centipoise at 100 sec$^{-1}$ at the treating temperature, which may range from about 79.4° C. (175° F.) to about 135° C. (275° F.), such as from about 79.4° C. (175° F.) to about 121° C. (250° F.), from about 93.3° C. (200° F.) to about 121° C. (250° F.), or from about 93.3° C. (200° F.) to about 107° C. (225° F.). In embodiments, the crosslinked structure formed that is acted upon by the breaking agent may be a gel that is substantially non-rigid after substantial crosslinking. In some embodiments, a crosslinked structure that is acted upon by the breaking agent is a non-rigid gel. Non-rigidity can be determined by any techniques known to those of ordinary skill in the art. The storage modulus G' of substantially crosslinked fluid system of the present disclosure, as measured according to standard protocols given in U.S. Pat. No. 6,011,075, the disclosure of which is hereby incorporated by reference in its entirety, may be about 150 dynes/cm$^2$ to about 500,000 dynes/cm$^2$, such as from about 1000 dynes/cm$^2$ to about 200,000 dynes/cm$^2$, or from about 10,000 dynes/cm$^2$ to about 150,000 dynes/cm$^2$.

Embodiments may also include proppant particles that are substantially insoluble in the fluids of the formation. Proppant particles carried by the unviscosified and/or viscosified fluids remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it may be from about 20 to about 150 U.S. Standard Mesh in size. With synthetic proppants, mesh sizes about 8 or greater may be used. Naturally occurring materials may be underived and/or unprocessed naturally occurring materials, as well as materials based on naturally occurring materials that have been processed and/or derived. Suitable examples of naturally occurring particulate materials for use as proppants include: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particulation, processing, etc.

The concentration of proppant in the unviscosified and/or viscosified can be any concentration known in the art. For example, the concentration of proppant in the fluid may be in the range of from about 0.03 to about 3 kilograms of proppant added per liter of liquid phase. Also, any of the proppant particles can further be coated with a resin to potentially improve the strength, clustering ability, and flow back properties of the proppant.

Embodiments may further use unviscosified and/or viscosified fluids containing other additives and chemicals that are known to be commonly used in oilfield applications by those skilled in the art. These include materials such as surfactants in addition to those mentioned hereinabove, breaker activators (breaker aids) in addition to those mentioned hereinabove, oxygen scavengers, alcohol stabilizers, scale inhibitors, corrosion inhibitors, fluid-loss additives, bactericides and biocides such as 2,2-dibromo-3-nitrilopropionamine or glutaraldehyde, and the like. Also, they may include a co-surfactant to optimize viscosity or to minimize the formation of stable emulsions that contain components of crude oil.

In embodiments, the treatment fluid may be driven into a wellbore by a pumping system that pumps one or more treatment fluids into the wellbore. The pumping systems may include mixing or combining devices, wherein various components, such as fluids, solids, and/or gases maybe mixed or combined prior to being pumped into the wellbore. The mixing or combining device may be controlled in a number of ways, including, but not limited to, using data obtained either downhole from the wellbore, surface data, or some combination thereof.

The foregoing is further illustrated by reference to the following examples, which are presented for purposes of illustration and are not intended to limit the scope of the present disclosure. All readings using the Accumet AR50 pH meter were calibrated using 4, 7 and 10 pH standard buffers.

EXAMPLES

Example 1

A 1% by weight (about 80 pounds per thousand (ppt) (9.6 kg/m$^3$) gallons of base fluid) guar solution was prepared by hydrating the polymer in deionized (DI) water for 30 minutes. The stock solution was then separated into three samples (identified below as "Sample 1", "Sample 2" and "Sample 3").

Sample 1 had 12 gallons per thousand gallons (gpt) (1.44 kg/m$^3$) of a 1% solution of ASP FWB605E (a hemicellulase commercially available from NALCO) enzyme added and the pH was adjusted to 11.5 by adding a few drops of a dilute solution of sodium hydroxide (NaOH). The pH of the resulting solutions was determined using a calibrated Accumet AR50 pH meter.

Sample 2 had 12 gpt of 1% solution of ASP FWB605E (a hemicellulase commercially available from NALCO) enzyme added and pH was adjusted to 12 by adding a few drops of NaOH solution. The pH of the resulting solutions was determined using a calibrated Accumet AR50 pH meter.

Sample 3 was prepared in the exact same manner as Sample 1 except that Sample 3 did not contain any enzyme.

Prior to measuring the viscosity for Samples 1-3 on a Grace model 5600 viscometer, 20 ppt (2.4 kg/m$^3$) of 60% active, lipid coated fumaric acid was added to the rheometer cup. A variable temperature program was used for the tests (increasing the temperature from 75 to 175° F. (23.9 to 79.4° C.) in 2 hours followed by a constant temperature of 175° F. for 1 hour). All tests were done at a shear rate of 100 s$^{-1}$.

As shown in FIG. 1, 20 ppt (2.4 kg/m$^3$) of encapsulated fumaric acid (Sample 3) was not sufficient to break the polymer in the absence of an enzyme. For the fluids containing enzyme and acid (Samples 1 and 2), Sample 2 also did not show signs of breaking the polymer. The present inventors believe that a solution having a pH of 11.5 or higher denatures the enzyme to such a degree that it cannot return to active conformation even when pH is reduced by acid, which suggests a complete loss of enzyme activity. However, the enzyme in Sample 1 (at a pH of 11.5) was not denatured such that once the acid was released from the coating at about 155° F. (68.3° C.), the enzyme reverted back to the active form and within minutes reduced the viscosity of the polymer.

Example 2

A 1% by weight (80 ppt or 9.6 kg/m$^3$) guar solution was prepared by hydrating in DI water for 30 minutes. Next, 10 gpt (0.01 m$^3$/m$^3$) of a 1% solution of ASP FWB605E enzyme was added along with 20 ppt (2.4 kg/m$^3$) of polylactic acid (PLA) fibers. The pH was then adjusted to 11.5 by adding a few drops of NaOH solution. A variable temperature program was used for the Example 2 (i.e., the temperature was ramped from 75 to 200° F. (23.9 to 93.3° C.) in approximately 2 hours and then followed by a constant temperature of 200° F. (93.3° C.) for approximately 1 hour). The test was performed at a shear rate of 100 s$^{-1}$.

Figure 2:
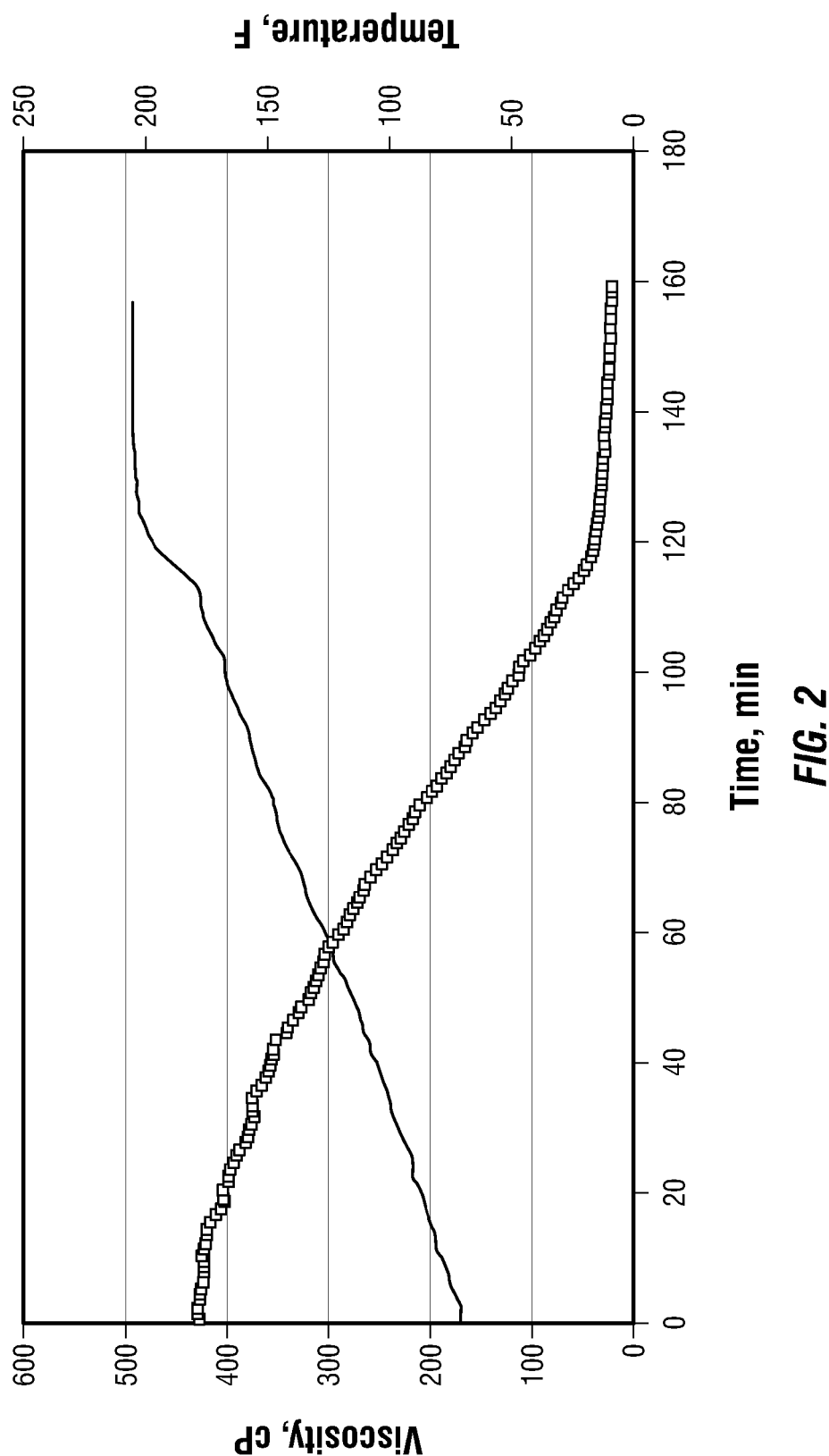
FIG. 2 is an illustration of the rheology profile of the fluid of Example 2.

The fluid viscosity was successfully reduced below 25 cP after about 120 minutes (2 hours), as shown below in FIG. 2.

Example 3

A 1% by weight (80 ppt or 9.6 kg/m$^3$) guar solution was prepared by hydrating guar gum in DI water for 30 minutes Next, 4 gpt (0.04 m$^3$/m$^3$) of a 1% solution of ASP FWB605E was added. The fluid was divided into 6 samples. The pH of each sample was then adjusted with NaOH solution to pH values of 6.9, 9.03, 10.03, 11.06, 12.02 and 13.08, respectively. All samples were tested on a Grace model 5600 viscometer, at 150° F. (65.6° C.) for 3 hours at a shear rate of 100 s$^{-1}$.

Figure 3:
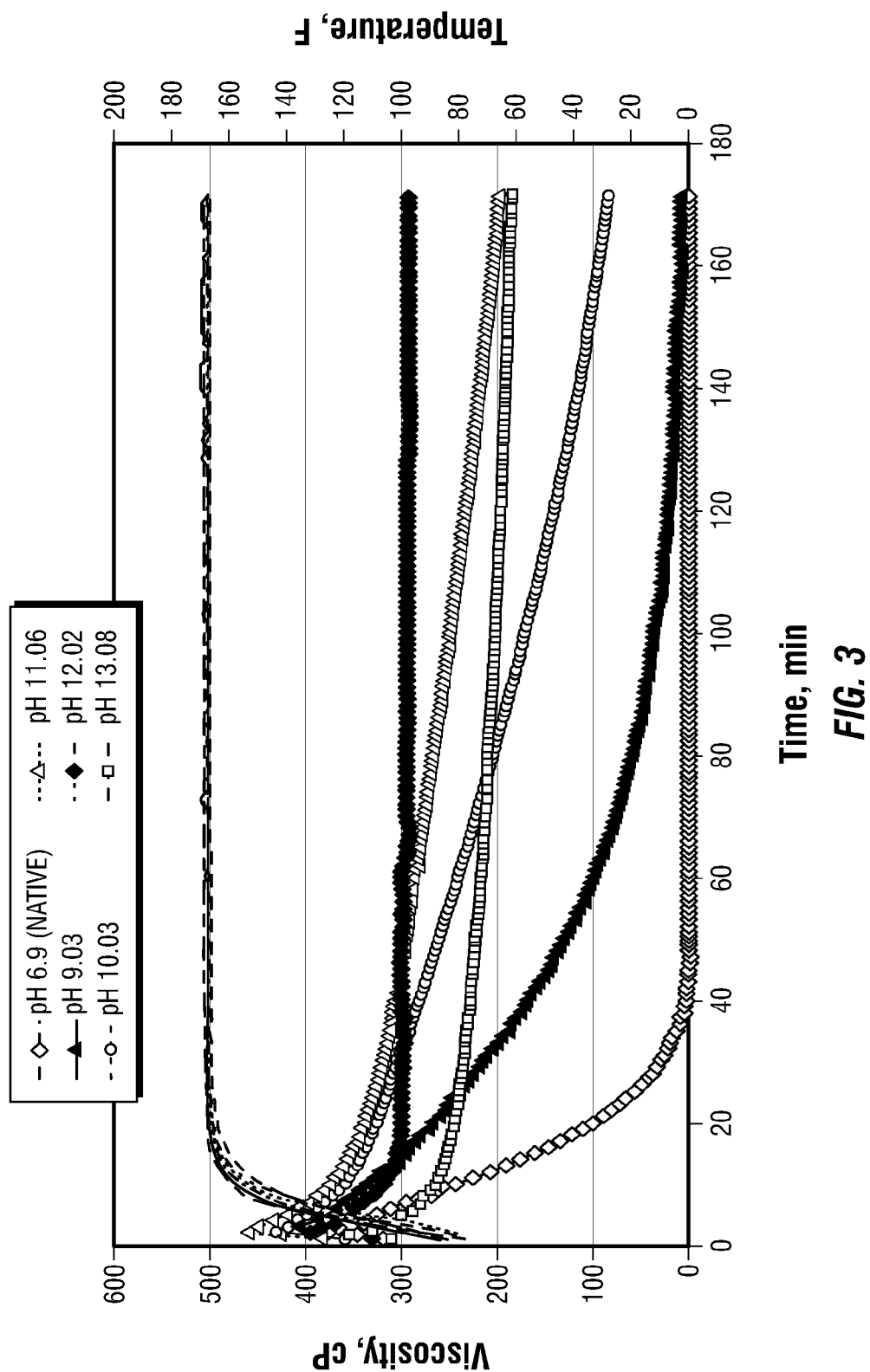
FIG. 3 is an illustration of the rheology profile of the fluids of Example 3.

As shown in FIG. 3, Example 3 shows the general effect of pH on linear guar breaking with an enzyme. At pH levels above 12, a flat curve results, suggesting the enzyme has no activity. Lower values of pH are effective in breaking.

Example 4

A 1% by weight (80 ppt or 9.6 kg/m$^3$) CMHPG solution was prepared by hydrating CMHPG in DI water for 30 minutes. The fluid was divided into 6 samples. Next, various amounts of a 1% solution of ASP FWB605E enzyme (shown in FIG. 4 as "X") was added to each sample as shown below in FIG. 4. The pH of each sample was then adjusted with a NaOH solution to the value shown on FIG. 4. All samples were tested on a Grace model 5600 viscometer, at 180° F. (82.2° C.) for 3 hours at a shear rate of 100 s$^{-1}$.

Figure 4:
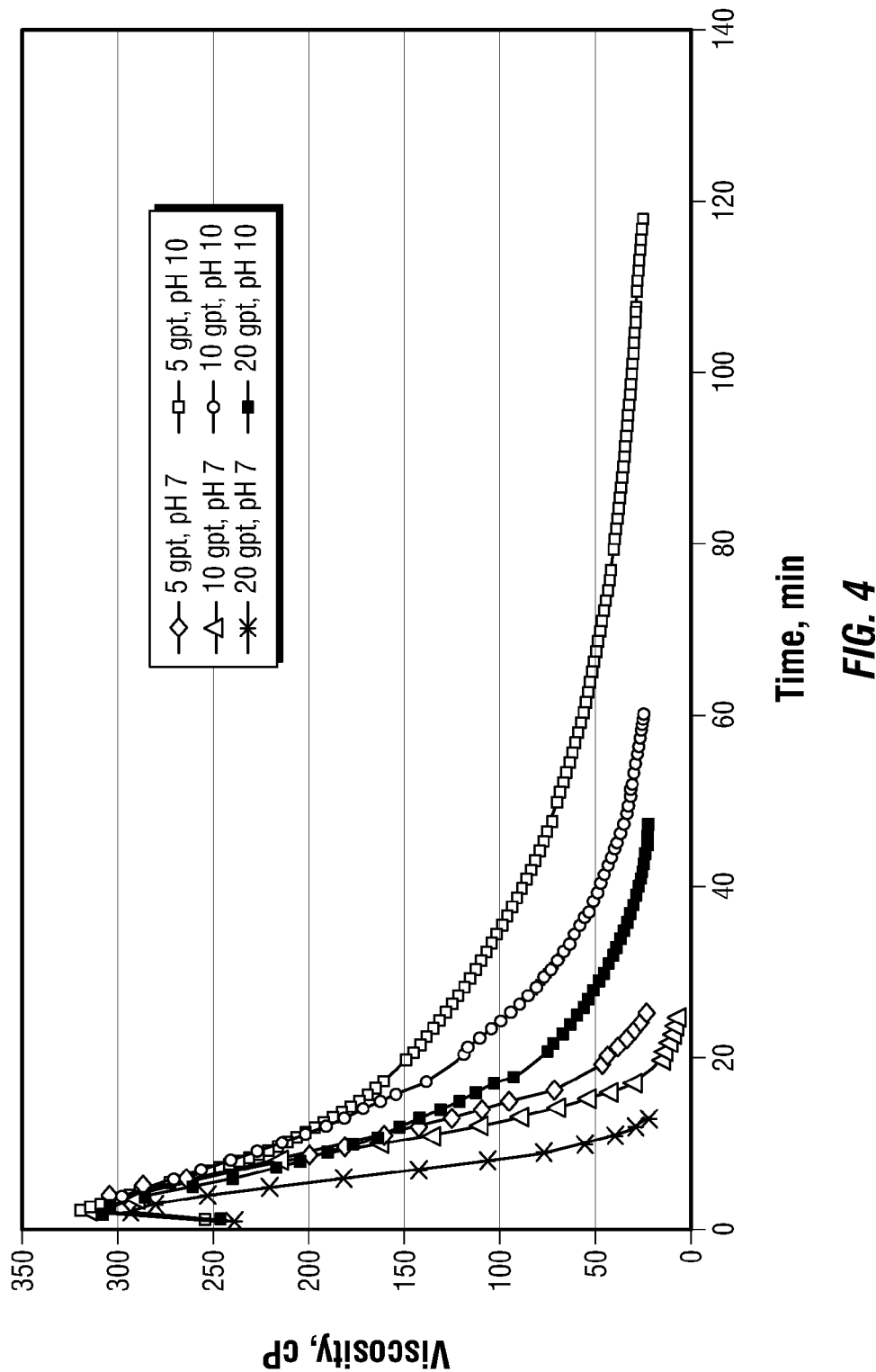
FIG. 4 is an illustration of the rheology profile of the fluids of Example 4 at various concentrations and pH.

As shown in FIG. 4, Example 4 illustrates that a higher pH decreases the activity of an enzyme breaker for a CMHPG polymer, while increasing the amount of the enzyme may cause more rapid breaking.

Example 5

A 1% by weight (about 80 pounds per thousand (ppt) (9.6 kg/m$^3$) gallons of water) tributyrin solution was prepared by adding the tributyrin to deionized (DI) water. A pH probe connected to an Accumet model AR50 pH meter was placed into the solution The initial pH was adjusted to about 12 and the container was placed into a water bath having a temperature of 130° F. (54.4° C.). The pH readings were recorded on a computer attached to the RS-232 port of the pH meter, and these results are shown in FIG. 5.

Figure 5:
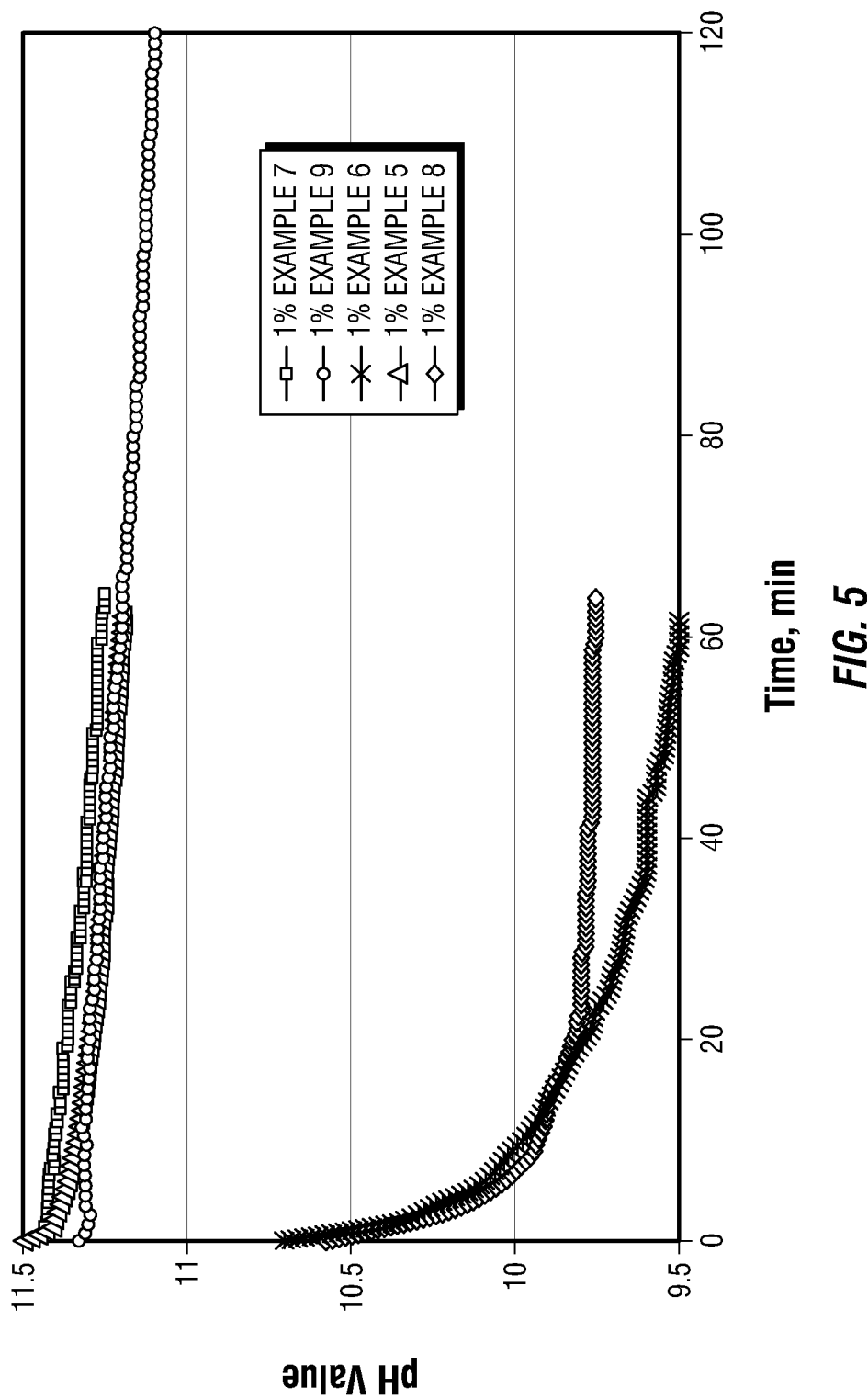
FIG. 5 is an illustration of the of the pH values over time for the fluids of Examples 5-9.

As shown in FIG. 5, Example 5 illustrates a decrease in pH with time as the ester hydrolyzes.

Example 6

A 1% by weight (about 80 pounds per thousand (ppt) (9.6 kg/m$^3$) gallons of water) tributyrin solution was prepared by adding the tributyrin to deionized (DI) water. A pH probe connected to an Accumet model AR50 pH meter was placed into the solution The initial pH was adjusted to about 12 and the container was placed into a water bath having a temperature of 200° F. (93.3° C.). The pH readings were recorded on a computer attached to the RS-232 port of the pH meter, and these results are shown in FIG. 5.

As shown in FIG. 5, Example 6 illustrates a decrease in pH with time as the tributryin ester hydrolyzes. The rate of change in the pH was faster for Example 6 than for Example 5 conducted at a lower temperature. Also, the number of pH units reduced by the ester for a given time of hydrolysis was larger for the higher temperature run shown in Example 6. The curve also suggests that further lowering of the pH will occur for this concentration of ester as time increases.

Example 7

A 1% by weight (about 80 pounds per thousand (ppt) (9.6 kg/m$^3$) gallons of water) butyl propionate solution was prepared by adding the butyl propionate to deionized (DI) water. A pH probe connected to an Accumet model AR50 pH meter was placed into the solution The initial pH was adjusted to about 12 and the container was placed into a water bath having a temperature of 130° F. (54.4° C.). The pH readings were recorded on a computer attached to the RS-232 port of the pH meter, and these results are shown in FIG. 5.

As shown in FIG. 5, Example 7 illustrates a decrease in pH with time as the butyl propionate ester hydrolyzes. The rate of hydrolysis was similar to Example 5 conducted at the same temperature.

Example 8

A 1% by weight (about 80 pounds per thousand (ppt) (9.6 kg/m$^3$) gallons of water) butyl propionate solution was prepared by adding the butyl propionate to deionized (DI) water. A pH probe connected to an Accumet model AR50 pH meter was placed into the solution The initial pH was adjusted to about 12 and the container was placed into a water bath having a temperature of 200° F. (93.3° C.). The pH readings were recorded on a computer attached to the RS-232 port of the pH meter, and these results are shown in FIG. 5.

As shown in FIG. 5, Example 8 illustrates a decrease in pH with time as the butyl propionate ester hydrolyzes. The rate of change in pH was faster than for Example 7 conducted at a lower temperature. Also, the number of pH units reduced by the ester for a given time of hydrolysis was much larger for the higher temperature run of Example 8.

Example 9

A 1% by weight (about 80 pounds per thousand (ppt) (9.6 kg/m$^3$) gallons of water) Lamchem PE-130K (an ester provided by Lambent technologies) solution was prepared by adding the Lamchem PE-130K to deionized (DI) water. A pH probe connected to an Accumet model AR50 pH meter was placed into the solution The initial pH was adjusted to about 12 and the container was placed into a water bath having a temperature of 130° F. (54.4° C.). The pH readings were recorded on a computer attached to the RS-232 port of the pH meter, and these results are shown in FIG. 5.

As shown in FIG. 5, Example 9 illustrates a decrease in pH with time as the Lamchem PE-130K ester hydrolyzes. The rate of hydrolysis was similar to Examples 5 and 7 conducted at the same temperature.

For Examples 5-9, the present inventors determined that a substantial pH reduction occurs in the first minute, suggesting the presence of some acid due to ester hydrolysis upon storage. The three esters show comparable rates of hydrolysis at 130° F. (54.4° C.), although the tributyrin ester of Example 5 had a slightly faster reduction in pH. At 200° F. (93.3° C.), Example 6 had a much steeper slope than shown by Example 8. These differences are most likely due to the chemical structure of the tributyrin ester. The data suggested that the delay time for activating the enzyme by pH reduction can be altered by numerous variables, such as the selection of the ester, the temperature of the fluid, and the concentration of the ester. For example, if the enzyme is most activated at a pH of 10, this state can be achieved at 200° F. (93.3° C.) at a time of about 11 minutes with a 1% solution of tributryin or butyl propionate. If the desired pH is 9.7, a 1 wt. % solution of tributyrin will reduce pH in about 22 minutes while the time for 1 wt. % butyl propionate exceeds one hour.

Although the preceding description has been described herein with reference to particular means, materials and embodiments, it is not intended to be limited to the particulars disclosed herein; rather, it extends to all functionally equivalent structures, methods and uses, such as are within the scope of the appended claims. Furthermore, although only a few example embodiments have been described in detail above, those skilled in the art will readily appreciate that many modifications are possible in the example embodiments without materially departing from the disclosure of METHODS FOR ACTIVATING ENZYME BREAKERS. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112(f) for any limitations of any of the claims herein, except for those in which the claim expressly uses the words 'means for' together with an associated function.

What is claimed is:

1. A method of treating a subterranean formation, the method comprising placing a well treatment fluid comprised of a crosslinkable component, an enzyme, and a breaker additive in the subterranean formation, the well treatment fluid having an initial pH from about 11 to about 12, wherein the crosslinkable component comprises a first viscosity while the well treatment fluid is placed in the subterranean formation, wherein the breaker additive reduces the pH of the well treatment fluid by about 2.0 to about 3.0 pH units resulting in a pH of about 8 to about 10 for the well treatment fluid after the well treatment fluid is placed in the subterranean formation in order to increase an activity of the enzyme and accelerate hydrolysis of the crosslinkable component, and wherein the crosslinkable component comprises a second viscosity higher than the first viscosity after the well treatment fluid is placed in the subterranean formation.

2. The method of claim 1, wherein the breaker additive is a polymeric fiber.

3. The method of claim 1, wherein the breaker additive is an acid encapsulated with an encapsulating material.

4. The method of claim 1, wherein the breaker additive is an ester.

5. The method of claim 4, wherein the ester is encapsulated with an encapsulating material.

6. The method of claim 1, wherein the well treatment fluid comprises an initial viscosity from about 1 cP to about 100 cP.

7. The method of claim 1, wherein the breaker additive degrades when the well treatment fluid is in the subterranean formation to cause the well treatment fluid to have a third viscosity that is lower by at least one order of magnitude than the second viscosity.

8. A method of treating a subterranean formation, the method comprising
placing a well treatment fluid comprised of at least an enzyme and a breaker additive in the subterranean formation, the well treatment fluid having an initial pH from about 11 to about 12,
wherein the breaker additive reduces the pH of the well treatment fluid by about 2.0 to about 3.0 pH units after the well treatment fluid is placed in the subterranean formation, resulting in a pH of about 8 to about 10 for the well treatment fluid in order to increase the activity of the enzyme and accelerate hydrolysis of a crosslinkable component of the well treatment fluid, and wherein the breaker additive comprises an encapsulating material configured to melt when a surrounding temperature exceeds a threshold temperature.

9. The method of claim 8, wherein the breaker additive comprises a polymeric fiber.

10. The method of claim 8, wherein the breaker additive comprises an acid encapsulated with the encapsulating material.

11. The method of claim 8, wherein the breaker additive comprises an ester.

12. The method of claim 11, wherein the ester is encapsulated with the encapsulating material.

13. The method of claim 8, wherein the crosslinkable component comprises at least one of a copolymer of 2-acrylamido-2-methyl-propane sulfonic acid and acrylamide; a terpolymer containing monomers of 2-acrylamido-2-methyl-propane sulfonic acid, acrylic acid, acrylamide, vinyl pyrollidone; or derivatives thereof.

14. The method of claim 8, wherein the breaker additive comprises a chemical that reduces the initial pH of the well treatment fluid after the surrounding temperature of the well treatment fluid exceeds the threshold temperature.

15. The method of claim 8, wherein the breaker additive reduces a viscosity of the well treatment fluid by at least one order of magnitude.

16. The method of claim 8, wherein the enzyme is initially in an inactive state due to at least the solution pH and temperature.

17. The method of claim 1, wherein the enzyme is not encapsulated.

* * * * *